US010532277B2

(12) United States Patent
Higgins et al.

(10) Patent No.: US 10,532,277 B2
(45) Date of Patent: Jan. 14, 2020

(54) HAND-HELD CONTROLLERS WITH LIGHT-EMITTING DIODES SYNCHRONIZED TO AN EXTERNAL CAMERA

(71) Applicant: Facebook Technologies, LLC, Menlo Park, CA (US)

(72) Inventors: Jason Andrew Higgins, Seattle, WA (US); Dov Katz, Menlo Park, CA (US); Paul Buckley, Seattle, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 201 days.

(21) Appl. No.: 14/737,169

(22) Filed: Jun. 11, 2015

(65) Prior Publication Data
US 2016/0364910 A1 Dec. 15, 2016

(51) Int. Cl.
| *A63F 9/24* | (2006.01) |
| *A63F 13/24* | (2014.01) |
| *A63F 13/235* | (2014.01) |
| *A63F 13/213* | (2014.01) |
| *G02B 27/01* | (2006.01) |
| *G06F 3/01* | (2006.01) |

(52) U.S. Cl.
CPC .............. *A63F 9/24* (2013.01); *A63F 13/213* (2014.09); *A63F 13/235* (2014.09); *A63F 13/24* (2014.09); *G02B 27/017* (2013.01); *G06F 3/011* (2013.01)

(58) Field of Classification Search
CPC ...... G06F 3/011; G06T 19/006; A63F 13/235; A63F 13/213; A63F 13/24; A63F 9/24
See application file for complete search history.

(56) References Cited

U.S. PATENT DOCUMENTS

| 7,775,884 B1* | 8/2010 | McCauley | A63F 13/06 463/39 |
| 9,319,980 B1* | 4/2016 | Lewkow | H04W 52/02 |
| 2008/0088593 A1* | 4/2008 | Smoot | G06F 3/0425 345/173 |
| 2011/0294579 A1* | 12/2011 | Marks | H04N 13/10 463/36 |
| 2014/0118257 A1* | 5/2014 | Baldwin | G06F 3/017 345/158 |
| 2014/0152188 A1* | 6/2014 | Bora | H05B 33/0863 315/210 |
| 2014/0228124 A1* | 8/2014 | Plagge | G08C 23/04 463/39 |
| 2015/0015482 A1* | 1/2015 | Njolstad | G06F 3/0386 345/156 |

(Continued)

OTHER PUBLICATIONS

Ben Lang, Sixense STEM Update, Nov. 27, 2013, http://www.roadtovr.com/sixense-stem-update-pre-order-black-friday-sale-prototype-colors/.*

*Primary Examiner* — Michael Le
(74) *Attorney, Agent, or Firm* — Morgan, Lewis & Bockius LLP

(57) ABSTRACT

A hand-held controller for a virtual-reality system includes an antenna, a grip, a cage coupled to the grip, and a plurality of LEDs on an outer surface of the cage. Wireless signals are received from a remote camera via the antenna. The plurality of LEDs is duty-cycled, which includes turning on the plurality of LEDs at times determined using the wireless signals. The times when the plurality of LEDs is turned on correspond to times when the remote camera captures images of the hand-held controller.

8 Claims, 8 Drawing Sheets

(56) References Cited

U.S. PATENT DOCUMENTS

2015/0116214 A1* 4/2015 Grunnet-Jepsen ...... G06F 3/017
  345/157
2015/0258431 A1* 9/2015 Stafford ................ A63F 13/213
  463/31
2016/0307332 A1* 10/2016 Ranjan ................. H04N 5/2256

* cited by examiner

HAND-HELD CONTROLLERS WITH LIGHT-EMITTING DIODES SYNCHRONIZED TO AN EXTERNAL CAMERA

TECHNICAL FIELD

This relates generally to gaming entertainment and virtual-reality systems, and more specifically to hand-held controllers capable of being sensed or tracked by an image capturing device of a virtual-reality system in order to detect a user's hand movements.

BACKGROUND

Gaming entertainment systems typically include a hand-held controller, game controller, or other controller. A user manipulates the controller to send commands or other instructions to the gaming entertainment system to control a video game or other simulation. For example, the controller may be provided with several buttons or knobs operated by the user, such as a joystick.

Conventional gaming controllers typically merely provide buttons or knobs for operation by the user, where each of the buttons or knobs corresponds to a desired action to be carried out on a display of the gaming entertainment or virtual-reality system. The action carried out on the screen is not representative of a motion that the user is physically making, and therefore has less of a feeling of "reality" to the user. As such, conventional controllers lack the capability of being tracked to simulate actual motion of a user holding the controller and enhance the user's virtual-reality experience.

SUMMARY

Accordingly, there is a need for hand-held controllers capable of being tracked to simulate actual motion of a user holding the controller, thereby enhancing the user virtual-reality experience. The hand-held controllers should be low power, to ensure a long battery life.

In some embodiments, a hand-held controller for a virtual-reality system includes a grip, a cage coupled to the grip, and a plurality of light-emitting diodes (LEDs) on an outer surface of the cage. The hand-held controller also includes an antenna to receive wireless signals and an LED driver to duty-cycle the plurality of LEDs in accordance with wireless signals received from a remote camera via the antenna.

In some embodiments, a method is performed at a hand-held controller for a virtual-reality system. The hand-held controller includes an antenna, a grip, a cage coupled to the grip, and a plurality of LEDs on an outer surface of the cage. In the method, wireless signals are received from a remote camera via the antenna. The plurality of LEDs is duty-cycled, which includes turning on the plurality of LEDs at times determined using the wireless signals. The times when the plurality of LEDs is turned on correspond to times when the remote camera captures images of the hand-held controller.

The plurality of LEDs allows motion of the hand-held controller to be tracked. Duty-cycling of the LEDs reduces power consumption and extends battery life, because the LEDs are not always on.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

DETAILED DESCRIPTION

Figure 1A:
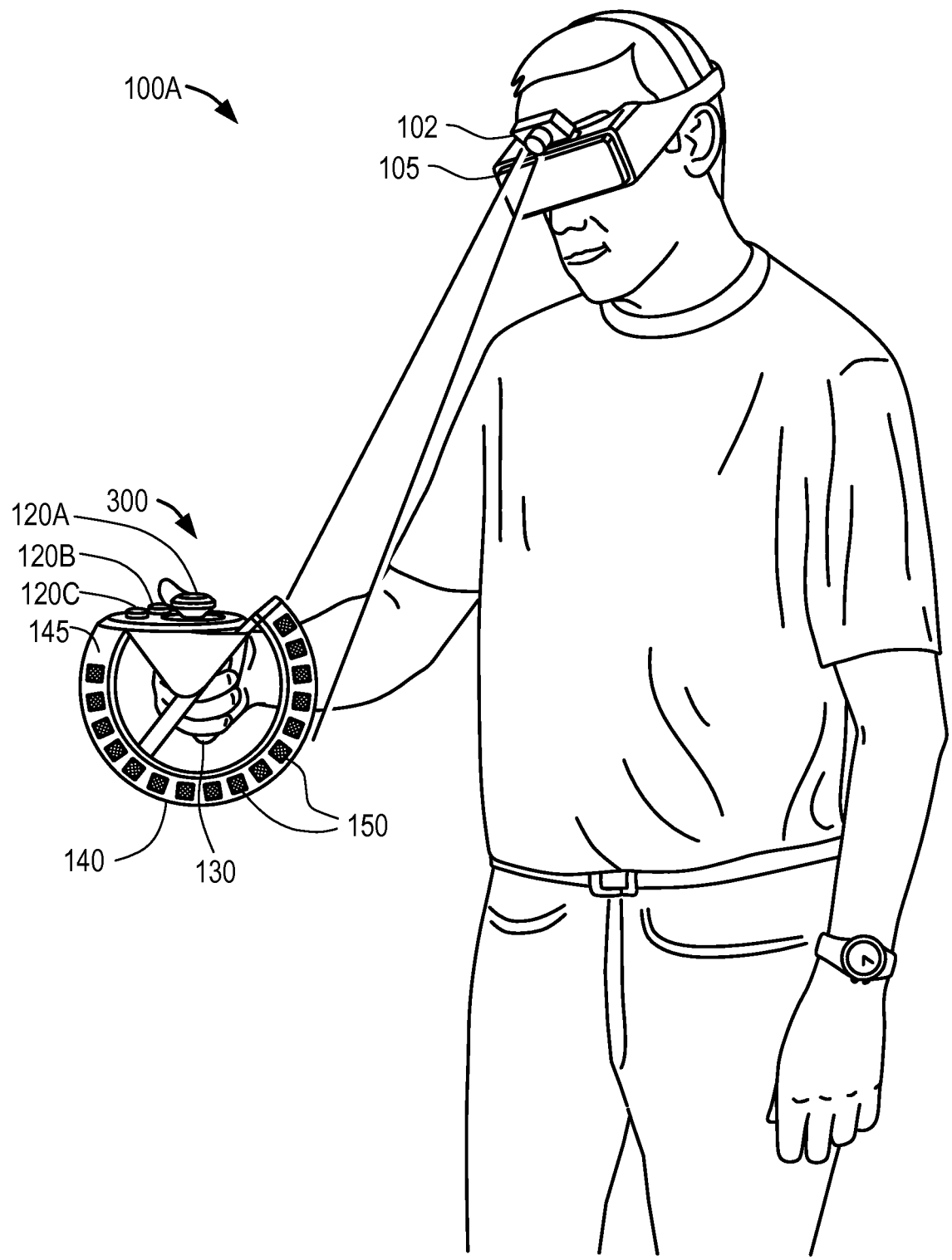
FIGS. 1A and 1B illustrate exemplary virtual-reality systems including a front-looking camera extending from a head-mounted display (HMD) in accordance with some embodiments.

Virtual-reality or gaming systems may include hand-held controllers held in one or both hands by a user while playing a video game or carrying out some other virtual-reality activity in order to operate the user-input keys (e.g., buttons, thumbstick, directional pad, trigger, etc.) on the controller. While playing the game or carrying out the virtual-reality activity, the user may become so immersed in the game as to move their hands in a manner mimicking a desired action (e.g., performed by pressing one of the buttons while holding the controller). For example, during playing a boxing game a user may press an "L" button corresponding to a left hand punch while simultaneously jerking their left hand for a more "real" sensation. It is desirable to display the hand motion of the user as a corresponding motion by an image subject on the screen in the virtual-reality system.

Accordingly, the present disclosure describes hand-held controllers in virtual-reality systems that can detect physical positions of the hand-held controllers at various points in time to simulate actual hand movements of users holding the controllers to allow easy tracking of the user hand movements and enhance the user virtual-reality experience. The detected positions and movements of the hand-held controllers may be used as additional commands to control various aspects of the game or other simulation being played. Positions of the hand-held controllers are detected by detecting the positions of LEDs on the hand-held controllers. The LEDs are duty-cycled to reduce their power consumption.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first wireless signal could be termed a second wireless signal, and, similarly, a second wireless signal could be termed a first wireless signal, without departing from the scope of the various described embodiments. The first wireless signal and the second wireless signal are both wireless signals, but they are not the same wireless signal.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

Figure 1B:
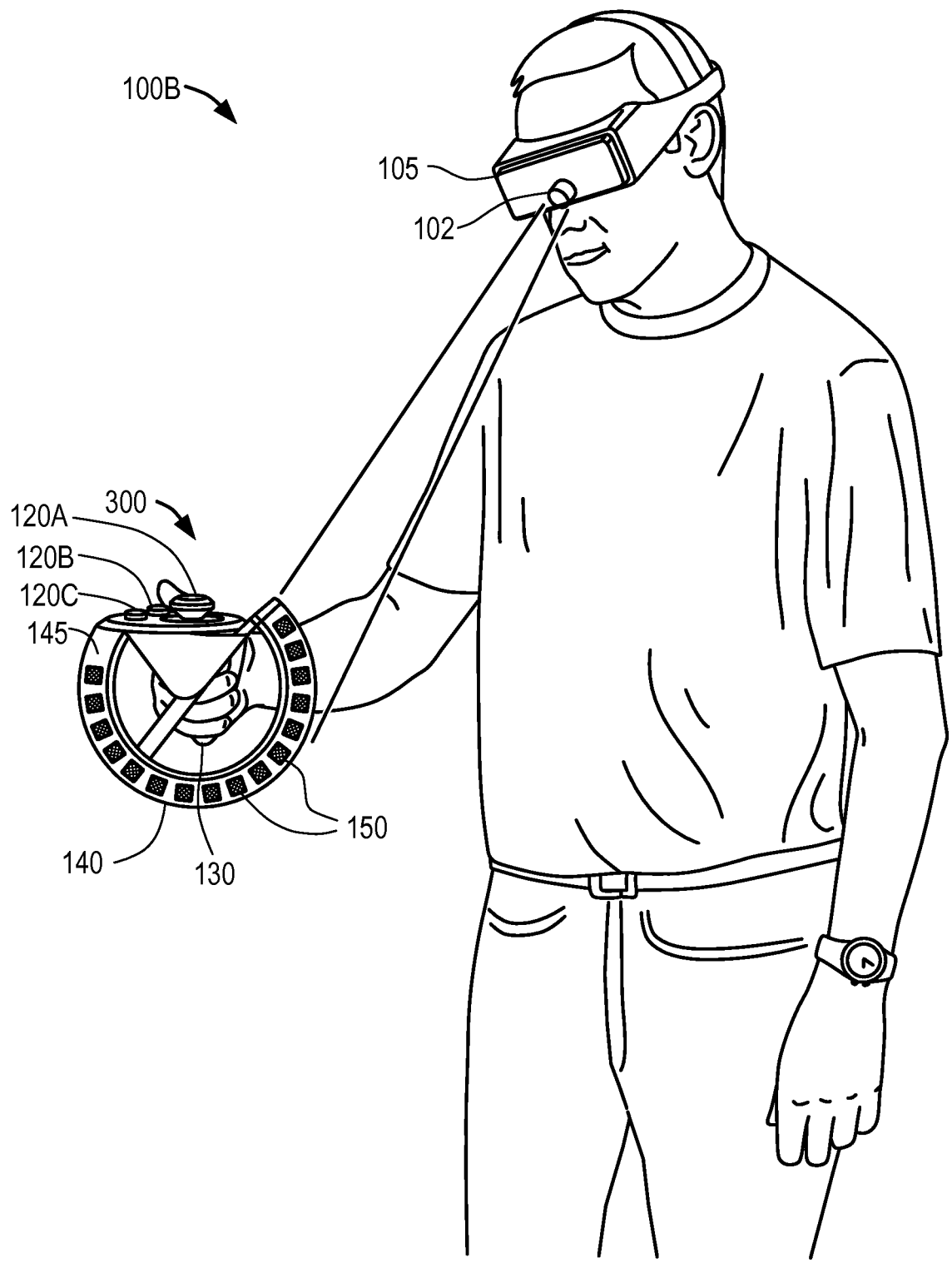

FIGS. 1A and 1B illustrate exemplary virtual-reality systems 100A and 100B including a front-looking camera 102 coupled to (e.g., extending from) a head-mounted display (HMD) 105, and a hand-held controller 300 in accordance with some embodiments. The hand-held controller 300 generally comprises a first user-input key 120A, a grip 130, an outward-facing surface 145 coupled to the grip 130, and a plurality of LEDs 150 coupled to (e.g., mounted on or embedded in) the outward-facing surface 145. The LEDs 150 are configured to emit light that is detectable by camera 102. The camera 102 is positioned to detect movement in positions of the LEDs 150 when the user makes a motion (e.g., waving, swinging, punching, shaking, or any other hand motion) while holding the grip 130 of the controller. By detecting a movement of the LEDs 150 on the controller 300, the camera is able to capture sequential positions of the controller 300 over time, and thus allow motion of an image subject to be modeled in virtual reality based on actual physical motions made by the user (e.g., punching, swinging, etc) as described above. The HMD 105 is configured to display a view which shifts as a user shifts their head in a corresponding direction or tilts their head at an angle. The HMD 105 is communicatively coupleable to the controller 300 and the camera 102 so as to be able to display the detected motions of the controller 300 along with motions of the head of the user as those of an image subject of the virtual-reality system 100. For example, the HMD 105 communicates wirelessly with the controller 300 and communicates with the camera 102 through a wired or wireless connection.

In some embodiments, as illustrated for the virtual-reality system 100A (FIG. 1A), the camera 102 extends from (e.g., is mounted to) the top of the HMD 105 (e.g., at a downward facing angle) such that the controller 300 having the plurality of LEDs 150 is within view of the camera 102 when the user holds the grip 130 in a neutral position. Alternatively, the camera 102 extends from (e.g., is mounted to) a side of the HMD 105 or the bottom of the HMD 105. In these examples, the forward-looking camera 102 is external to and communicatively coupled or coupleable to the HMD 105 (e.g., through a wired connection with the HMD 105 or wirelessly). A neutral position refers to when users hold the controller 300 in front of them with the grip 130 between palm and fingers and otherwise relax their arms and wrists. The distance at which the camera 102 is extendable from the HMD 105 may be adjustable depending on how far away the user holds the controller 300 from the their body.

In some embodiments, as illustrated for the virtual-reality system 100B (FIG. 1B), the camera 102 extends from a front surface of the HMD 105. For example, a first portion of the camera 102 is in front of the HMD 105 while a second portion of the camera 102 is housed within the HMD 105. Extending the camera 102 from the front surface of the HMD 105 provides a wide (e.g., 180°) field of view for the camera 102. In still other embodiments, the camera is embedded entirely within the HMD 105 (e.g., with the lens exposed through a transparent portion of the front surface of the HMD 105).

The camera 102 may be configured with sensors to sense light emitted by the LEDs 150. The camera 102 is configured to sense a position of the controller 300 or LEDs 150 based on the light emitted. The camera 102 or HMD 105 thus may determine the position and orientation of the controller 300. In some embodiments, based on a distance of the controller 300 from the user's body, the camera 102 is adapted to either extend away from or retract towards the HMD. In some embodiments, an angle at which the camera faces the controller 102 is also similarly adjustable depending on orientation of the controller 300 and the plurality of LEDs.

In some embodiments, forward facing camera 102 is positioned to detect the light emitted by the LEDs 150 when the outward-facing surface 145 is positioned above the user's hand in the neutral position.

Figure 2:
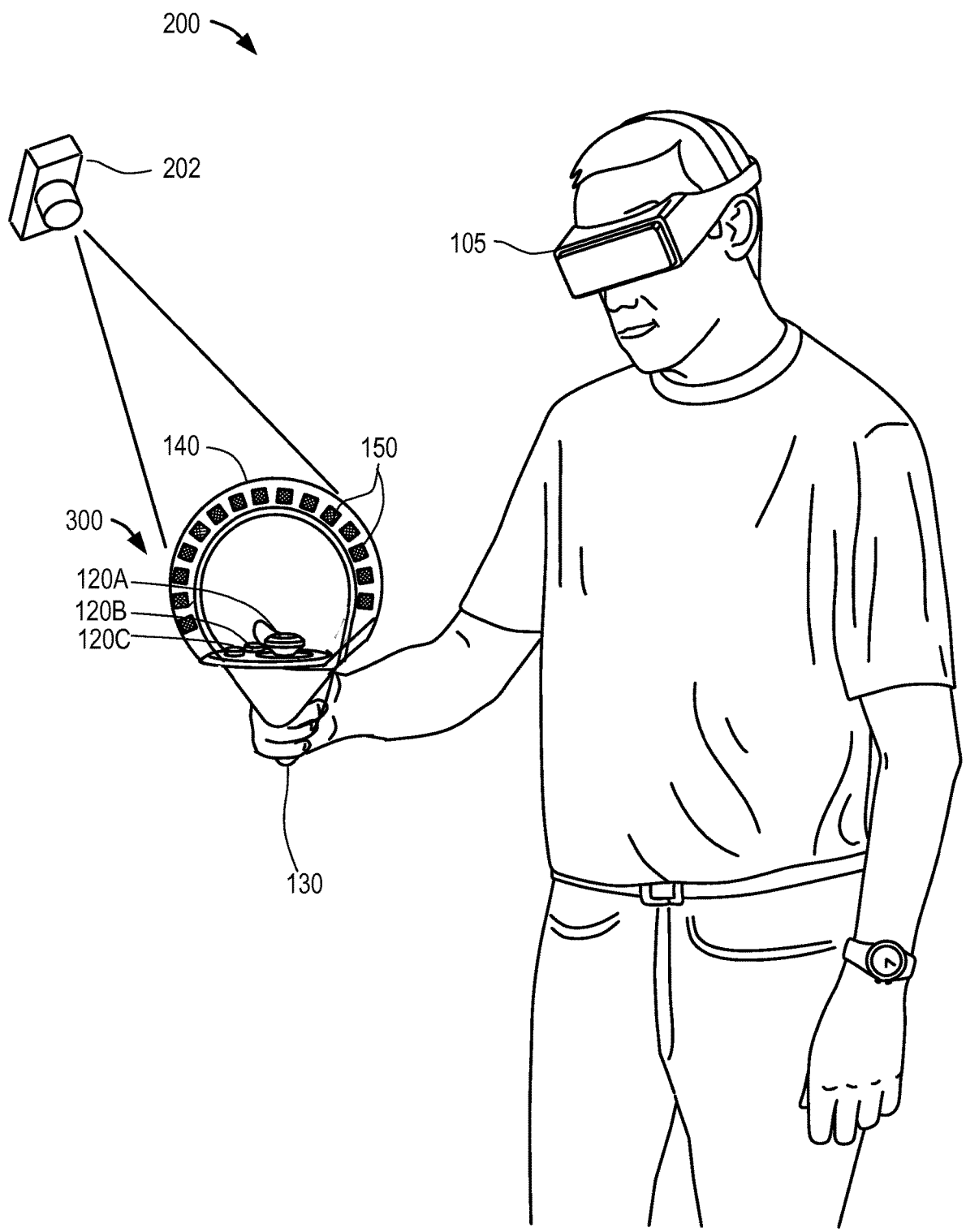
FIG. 2 illustrates an exemplary virtual-reality system including a head-mounted display and an external camera in accordance with some embodiments.

FIG. 2 illustrates an exemplary virtual-reality system 200 including a head-mounted display 105 and an external camera 202 in accordance with some embodiments. The camera 202 is external to and communicatively (e.g., wirelessly) coupleable to the HMD 105. Here, the camera 202 is positioned in front of the user and at least a portion of the LEDs 150 are positioned to face away from the user so as to be visible or detectable to the external camera 202 when the user holds the grip 130 in the neutral position.

As described for the camera 102, the camera 202 detects movement of the LEDs 150 when the user makes a motion (e.g., waving, swinging, punching, shaking, or any other hand motion) while holding the grip 130 of the controller. In some embodiments, as illustrated in FIG. 2, the outward-facing surface 145 is positioned such that it is located above the user hand when the user holds the grip 130 in the neutral position. Given this orientation, the outward-facing surface 145 is within the view of the external forward-looking camera 202 which is separate from the HMD 105.

In some embodiments, the camera 102, 202 may be customized for the purposes of the virtual-reality system 100. In some embodiments, the camera 102, 202 may include but not be limited to a commercially available camera product of any type or brand, such as for example a web-cam, an IR capable camera, and/or a USB camera, etc.

In some embodiments, the camera 102, 202 is electrically connected to a power source which may or may not be the same power source providing power to the HMD 105. The camera 102, 202 and the HMD 105 may be wireless; therefore, the power source may be one or more batteries.

In some embodiments, the LEDs 150 are positioned to allow the camera 102, 202 to detect at least six degrees of freedom of the controller 102. The six degrees of freedom are the controller's 300 position within x, y and z coordinates of space and the controller's 300 orientation—which includes the controller's 300 yaw, pitch and roll. The six degrees of freedom detected by the camera 102 are used to determine the user's movements of the controller 300 and model these movements in virtual reality.

In some embodiments, the LEDs 150 are infrared (IR) LEDs. The camera 102 is configured to detect the IR light emitted by the IR LEDs on the controller 300 and record the signals sensed from the emitted light to determine the position and orientation of the controller 300.

In some embodiments, the LEDs may be positioned on the outward-facing surface 145 of the controller 300 in any suitable pattern, order, or array. In some embodiments, the outward-facing surface 145 is an outer surface of a cage 140 coupled to the grip 130. The LEDs may be fixedly or detachably positioned on, and thus coupled to, the cage 140 by any appropriate method. For example, the LED's may be mounted on or embedded within the outer surface 145 of the cage 140. Alternatively, the LEDs may be on a sleeve that surrounds the cage 140 and effectively forms the outer surface 145 of the cage 140. Although the LEDs are described as being positioned on the outer 145 surface of the cage 140, they may additionally or alternatively be coupled to any other surface on the cage 140 and/or the rest of the controller 300.

The LEDs are electrically connected to a power source which may or may not be same power source providing power to the controller 300. The controller 300 may be wireless; therefore, the power source may be one or more batteries. The LEDs may be housed in diffused cases including a current limiting resistor to keep the current from the power source to the LED below the LED's maximum current rating so as to ensure maximum life of the LEDs. The LEDs may be activated when a suitable voltage is applied. By virtue of the LEDs being positioned in an area on the controller 300 detectable to the camera 102, 202, motion of the light produced by the LEDs that is detected by the camera 102, 202 is used as an indication of the positions and motion of the controller 300. In this way, motion of the controller is tracked by the camera 102, 202, allowing for corresponding virtual-reality hand motions to be shown on the HMD 105. For example, when the user makes a punching motion while playing a boxing game, movement of the LEDs in a manner corresponding to a punch may be detected and used to model the user's motion for the image subject displayed on the HMD 105 in the virtual-reality system 100. In this way, the present invention provides the advantage of enhancing the virtual-reality experience for the user by adding the additional element of hand motions to the image subject.

In some embodiments, the controller 300 includes the first user-input key 120A and may include one or more additional user-input keys 120B, 120C. A user-input key is a button, knob, switch, thumbstick, directional pad, or any other such part that a user presses or manipulates in some other way to carry out a specific action in a virtual-reality system (e.g., during gaming).

Figure 3A:
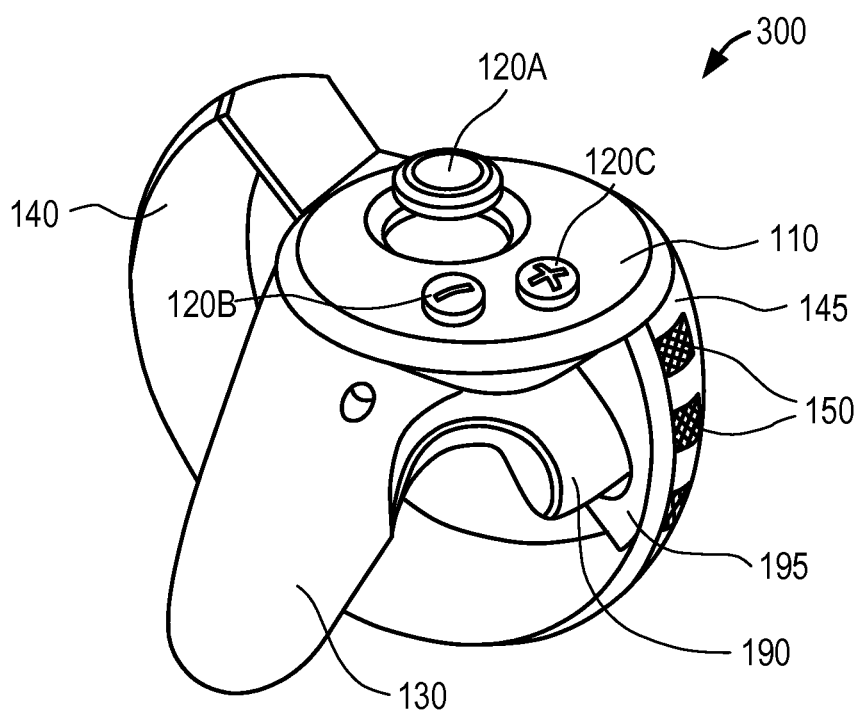
FIGS. 3A and 3B illustrate isometric views of a hand-held controller of the exemplary virtual-reality system in accordance with some embodiments.
Figure 3B:
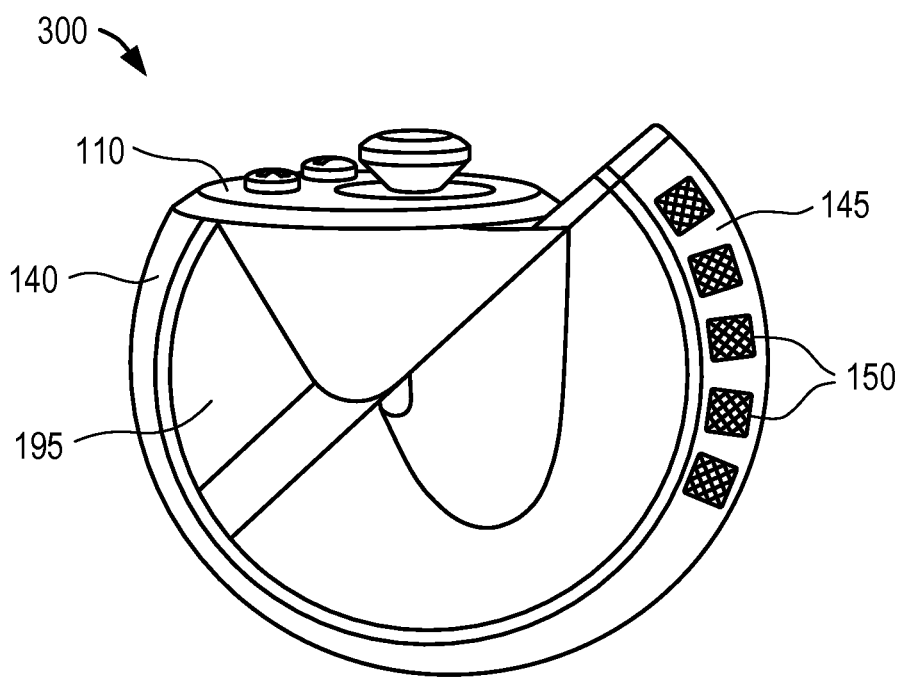

FIG. 3A and FIG. 3B illustrate isometric views of a hand-held controller 300 of the exemplary virtual-reality system 100 in accordance with some embodiments. In some embodiments, the first user-input key 120A may be selected from the group consisting of a thumbstick, a button, a trigger, and a directional pad. In some embodiments, the first user-input key 120A may be the button selected from the group consisting of an A or X button, a B or Y button, a start button, a back button, a forward button, and a home button. The A or B buttons may correspond to a selection action between at least two choices presented to the user in the gaming system. The X or Y button may correspond to a negative or affirmative decision to be made by the user dictating how the image subject will proceed in the game. X may correspond to an action of "NO" or "END" and Y may correspond to "YES" or "PROCEED/CONTINUE." The start button may be a button activated by the user to begin the virtual-reality (e.g., gaming) experience, and the back and forward buttons may indicate a direction in which the user desires the image subject to move. The home button may be a button activated to return the gaming experience back to a main menu or to start the game or activity from the beginning.

In some embodiments, the hand-held controller 300 further comprises a user-input surface 110 that includes the first user-input key 120A. The user-input surface 110 includes a plurality of user-input keys 120A, 120B and 120C. Alternatively, the user-input surface includes a single user-input key. In the example of FIGS. 1A-1B, FIG. 2, and FIGS. 3A and 3B, the user input keys include a thumbstick 120A and buttons 120B and 120C. Thus, the user-input surface 110 is a surface on the controller 300 where the user delivers an input by activating one or more user-input keys (e.g., by pressing a button or pushing a knob) corresponding to an action that the user desires to carry out in the virtual-reality system 100 (e.g., the virtual-reality system 100A or 100B).

Each of the user-input keys 120A, 120B and 120C is configured to communicate with the virtual-reality system 100 so as to translate an operation of the corresponding user-input key by the user into a corresponding action of the image subject displayed on the HMD 105 of the virtual-reality system 100.

In some embodiments, the user-input surface 110 includes a plurality of user-input keys including the first user-input key 120A, and respective user-input keys 120B, 120C of the plurality of user-input keys are selected from a group consisting of a thumbstick, a button, a trigger, and a directional pad.

In some embodiments, a home button is positioned further away from the other user-input keys. This configuration would allow for user-input keys that are used most (e.g. a directional pad used to dictate a direction of movement of the image subject, e.g., up-down-left-right) to be placed closer to the vicinity of the fingers and thumb. This configuration provides the advantage that the user would need to reach less to press the more frequently used user-input keys, thereby mitigating the possibility of ergonomic ailments associated with overreaching and overstretching fingers.

Figure 4:
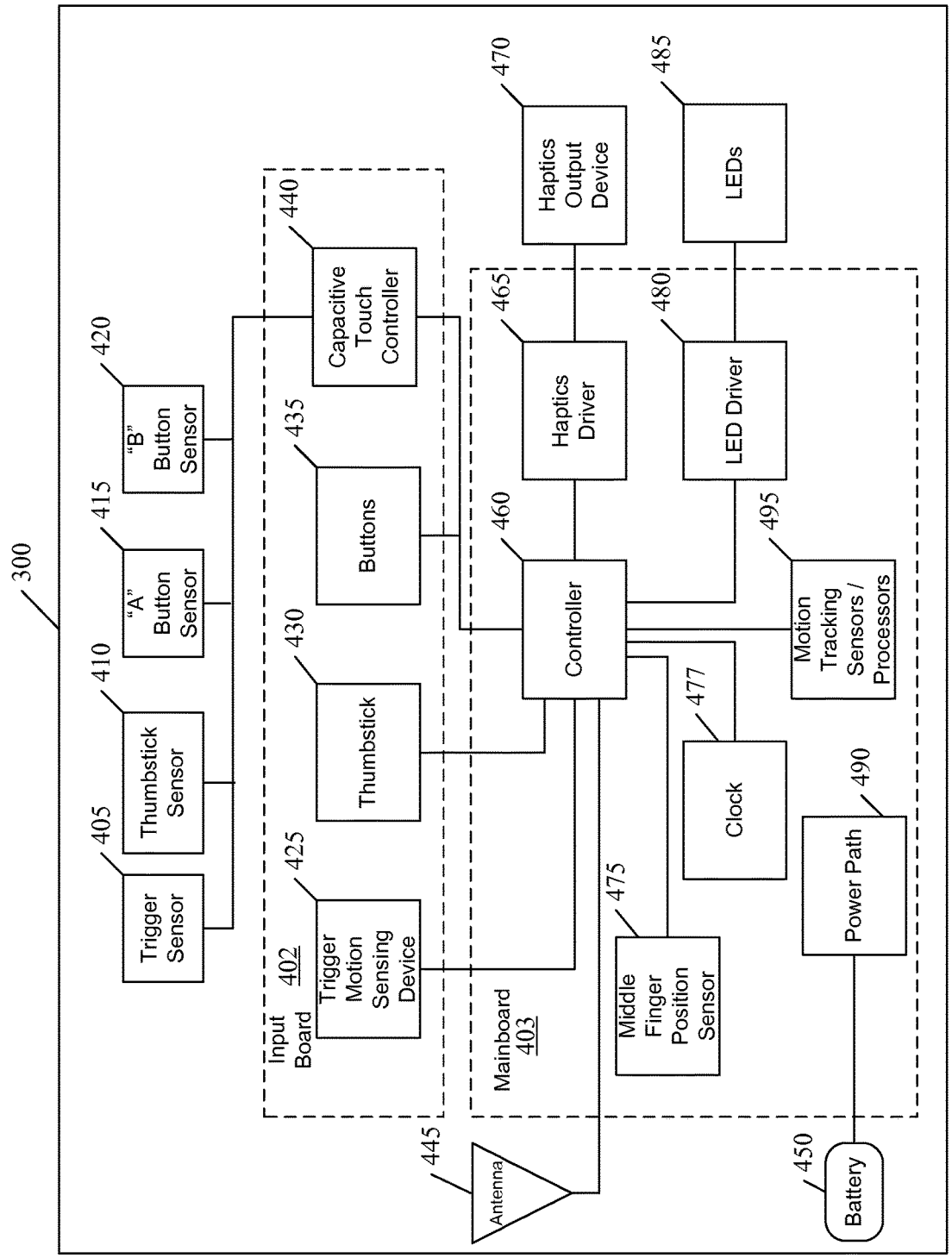
FIG. 4 is a block diagram illustrating an electrical configuration of the exemplary virtual-reality system in accordance with some embodiments.

In some embodiments, at least a portion of the user-input surface 110 is a touch-sensitive surface partitioned into a plurality of sections. Each section corresponds to a respective user-input key of the plurality of user-input keys. In this configuration, at least one touch sensor is positioned on a bottom surface of the user-input surface 110, as illustrated in FIG. 4, to detect a touch on the corresponding section. When a touch of a key by the user is detected by the sensors, the action associated with the corresponding user-input key touched is translated to an action of the subject image in the virtual-reality system.

In some embodiments, the grip 130 is coupled to the user-input surface 110. The grip 130 is a protruding structure of the controller 300 which the user grips in one hand to hold the controller 300. This configuration allows for the user to be able to grip the controller 300 between a palm and fingers (e.g., three or less fingers) while freeing up the thumb and, in some embodiments, another finger (e.g. the middle finger), for operating the user-input keys 120A, 120B and 120C. In some embodiments, the middle finger is freed to operate a trigger 190 mounted at least in part on the grip 130 as shall be described below.

In some embodiments the grip 130 is a separate part of the controller 300 that is removably coupled to the user input surface 110 and/or cage 140. The grip 130 and the user-input surface may be coupled by a method appropriate for their materials of construction. For example, the grip and user-input surface 110 may be formed of a hard plastic and may be coupled to each other by ultrasonic welding. Alternatively, the grip 130 and the user-input surface 110 may be coupled to each other by a fastening mechanism such as a screw or a bolt, or may be threadedly engaged with each other.

In some embodiments, the grip 130 is integrally formed with the user-input surface 110 and/or the cage 140, as one part (e.g., which may be formed from molding).

In some embodiments, the grip 130 is slanted at a predetermined angle with respect to the user-input surface 110 (e.g., with a plane through the user-input surface or a portion thereof) in order to provide a comfortable (e.g., optimum) ergonomic balance for a user between holding the grip in and using a thumb to operate the at least one user-input key.

In some embodiments, the cage 140 is coupled to the user-input surface 110. The cage 140, which may also be referred to as a tracking cage, has the outer surface 145 on which the plurality of LEDs 150 is positioned.

In the example of FIGS. 1A-1B and 3A-3B, the user-input surface 110 is outward-facing with respect to the cage 140. Alternatively, the user-input surface 110 may be inward-facing with respect to the cage 140, as illustrated in FIG. 2. For example, in some embodiments the user-input surface 110 forms an inner front surface of the cage 140 or is contiguous with the inner surface of the cage 140.

In some embodiments, the cage 140 may be formed of an over-molded rubber material so as to provide a surface providing sufficient friction with a user's palm thus improving the grip. In some embodiments, the cage 140 may be formed of a hard plastic, including, but not limited to high density polyethylene providing increased rigidity in structure. Additionally, any other suitable materials may be used.

In some embodiments, the cage 140 may be detachably coupled to at least one of the user-input surface 110 and the grip 130. The cage 140 may be slidably coupled to the user-input surface 110 through a protrusion spanning a width of each end portion of the cage 140 being slidably engaged with a corresponding groove positioned on an outer circumference of the user-input surface 110. The cage 140 may be coupled to the grip 130 through a fastening mechanism such as a bolt, a screw or the like. The detachable configuration of the cage 140 to the grip 130 or the user-input surface 110 yields the advantage of separating the aforementioned components for calibration as necessary. Detachable coupling of the components also allows for a separate and potentially cheaper manufacturing process of the parts. Furthermore, detachable coupling of the cage 140 to at least one of the user-input surface 110 and the grip 130 allows for separation thereof upon dropping of the controller 300, thereby reducing the need to replace the entire unit upon damage, but instead focus on fixing/replacing the separate damaged part.

In some embodiments, as illustrated in FIGS. 3A and 3B, the controller 300 may further comprise a structural web 195 coupling the cage 140 to the user-input surface 110. The large structural web 195 provides further rigidity in structure to the coupling between the cage 140 and the user-input surface 110 to mitigate damage and separation of these components upon dropping of the controller 300 by the user.

In some embodiments, a trigger 190 is mounted at least in part on the structural web 195. That is, the trigger 190 may be mounted between the structural web 190 and the grip 130. This configuration yields the advantage that the trigger is positioned adjacent to a location of a user's finger (e.g., middle finger) when the grip 130 is held in the neutral position. In some embodiments, the trigger may be both pushed and pulled by the middle finger, thus providing increased control in manipulating the trigger to achieve a desired action. The trigger 190 is an example of a user-input key.

FIG. 4 is a block diagram illustrating an electrical configuration of an exemplary hand-held controller 300 in accordance with some embodiments. The hand-held controller 300 includes an input board 402 and a main board 403 coupled to the input board 402. The input board 402 includes a trigger motion sensing device 425, a thumbstick 430, buttons 435, and a capacitive touch controller 440. In other examples, the input board 402 may include additional or alternative user-input keys. The trigger motion sensing device 425 detects user activation of a trigger (e.g., trigger 190).

The capacitive touch controller 440 is coupled to multiple sensors such that the input board 402 receives sensed signals from capacitive sensors resulting from a user's touch. For example, the capacitive sensors include a trigger sensor 405, a thumbstick sensor 410, an "A" button sensor 415, and/or a "B" button sensor 420. For example, the trigger sensor 405 may sense when a user touches the trigger. Similarly, the thumbstick sensor 410 senses a signal resulting from the user touching the thumbstick 410. Further, the button sensors 415 and 420 sense signals resulting from the user touching the buttons 415 and 420. Other capacitive sensors may be included for other user-input keys (e.g., a directional pad).

The mainboard 403 includes a controller 460, haptics driver 465, middle finger position sensor 475, clock 477, power path 490, motion tracking sensors/processors 495 and LED driver 480. The haptics driver 465 drives a haptics output device 470 that provides haptic effects. An example of the haptics output device 470 includes a short vibration feedback device that, when activated, causes the hand-held controller 300 to vibrate.

The mainboard 403 may be coupled to an antenna 445 to wirelessly receive and transmit signals. The hand-held controller (e.g., controller 300) thus may be wireless. The mainboard 403 may also be coupled to a power source (e.g., a battery 450) to provide power supply to the hand-held controller. The power may be supplied to the mainboard 403, and also to the input board 402, through a power path 490.

The LED driver 480 drives LEDs 485 (e.g., LEDs on the outer surface of the cage 140) under the control of the controller 460, and thus turns the LEDs 485 on or off, thereby duty-cycling the LEDs 485.

The middle finger position sensor 475 senses a position of the middle finger (e.g. when a user activates the trigger 190) and this information is processed by the controller 460. The motion tracking sensors/processors 495 include a plurality of motion sensors (e.g. accelerometers and/or gyroscopes) which tracks motion of the controller based on motions made by the user.

The camera 102, 202 includes at least one sensor for sensing light emitted by the LEDs 485 and a controller for processing the light images received for the LEDs 485 to detect positions of the controller over time.

In some embodiments, the HMD includes at least one sensor to sense signals from the controller 460 and a controller to process these signals into images displayed on the HMD. The processor of the HMD may further be configured to process information received from the camera 102, 202 relating to positions of the hand-held controller 300 for display on the HMD.

Figure 5A:
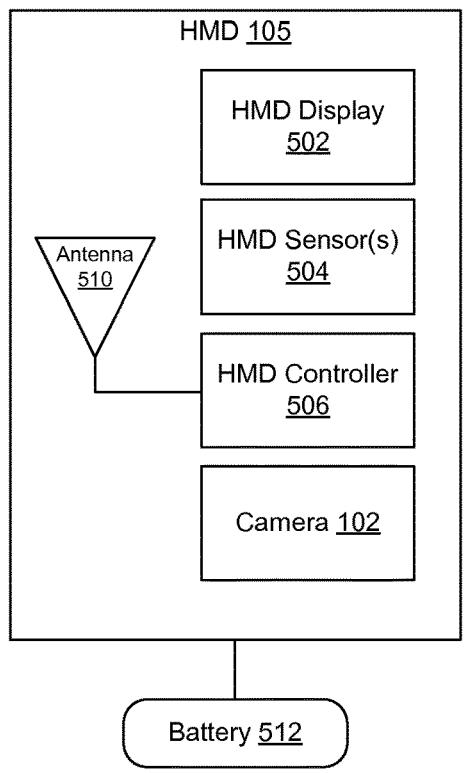
FIG. 5A is a block diagram of an exemplary head-mounted display in accordance with some embodiments.

FIG. 5A is a block diagram of an exemplary HMD 105 in accordance with some embodiments. The HMD 105 includes an HMD 502, one or more sensors 504, a controller 506, and a camera 102. The controller 506 is coupled to an antenna 510 for wireless communication (e.g., with hand-held controllers 300). The HMD 105 (e.g., including the camera 102) is powered by a battery 512.

Figure 5B:
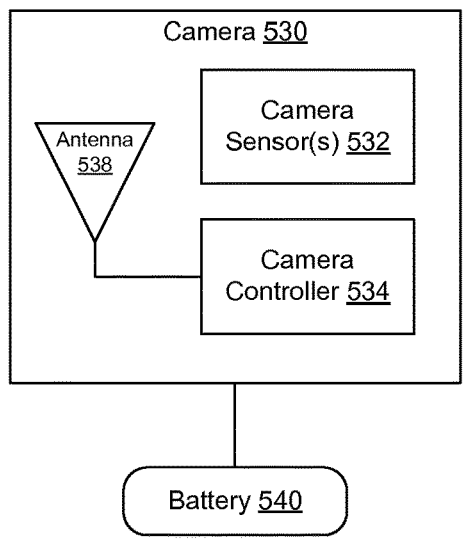
FIG. 5B is a block diagram of an exemplary camera in accordance with some embodiments.

FIG. 5B is a block diagram of an exemplary camera 530 in accordance with some embodiments. The camera 530 is an example of a camera 102 or 202. The camera 530 includes sensor(s) 532 and a controller 534. The controller 534 is coupled to an antenna 538 for wireless communication (e.g., with an HMD 105 and/or hand-held controllers 300). The camera 530 is powered by a battery 540; alternatively, the camera 530 is powered by a battery it shares with the HMD 105 (e.g., battery 512, FIG. 5A).

Some embodiments are directed to two hand-held controllers 300—one to be held in each of a user's hands. In some embodiments, the two controllers 300 may be identical, but for a position of at least one of the user-input keys, so as to be adapted specifically for either a left or right hand in which the controller is to be held. The first controller thus may be a right-handed controller and the second controller may be a left-handed controller. In other embodiments, the two controllers may be agnostic with respect to handedness (e.g., with both controllers having the same configuration of user-input keys, or with one controller having a configuration of user-input keys different than the other).

In some embodiments, the LED driver 480 (FIG. 4) duty-cycles the LEDs 485 (e.g., the LEDs 150) in synchronization with the camera 102/202, such that the LEDs 485 are turned on when the camera 102/202 is capturing an image (i.e., taking a picture) of the controller 300 and are turned off at other times, to save power.

Figure 6:
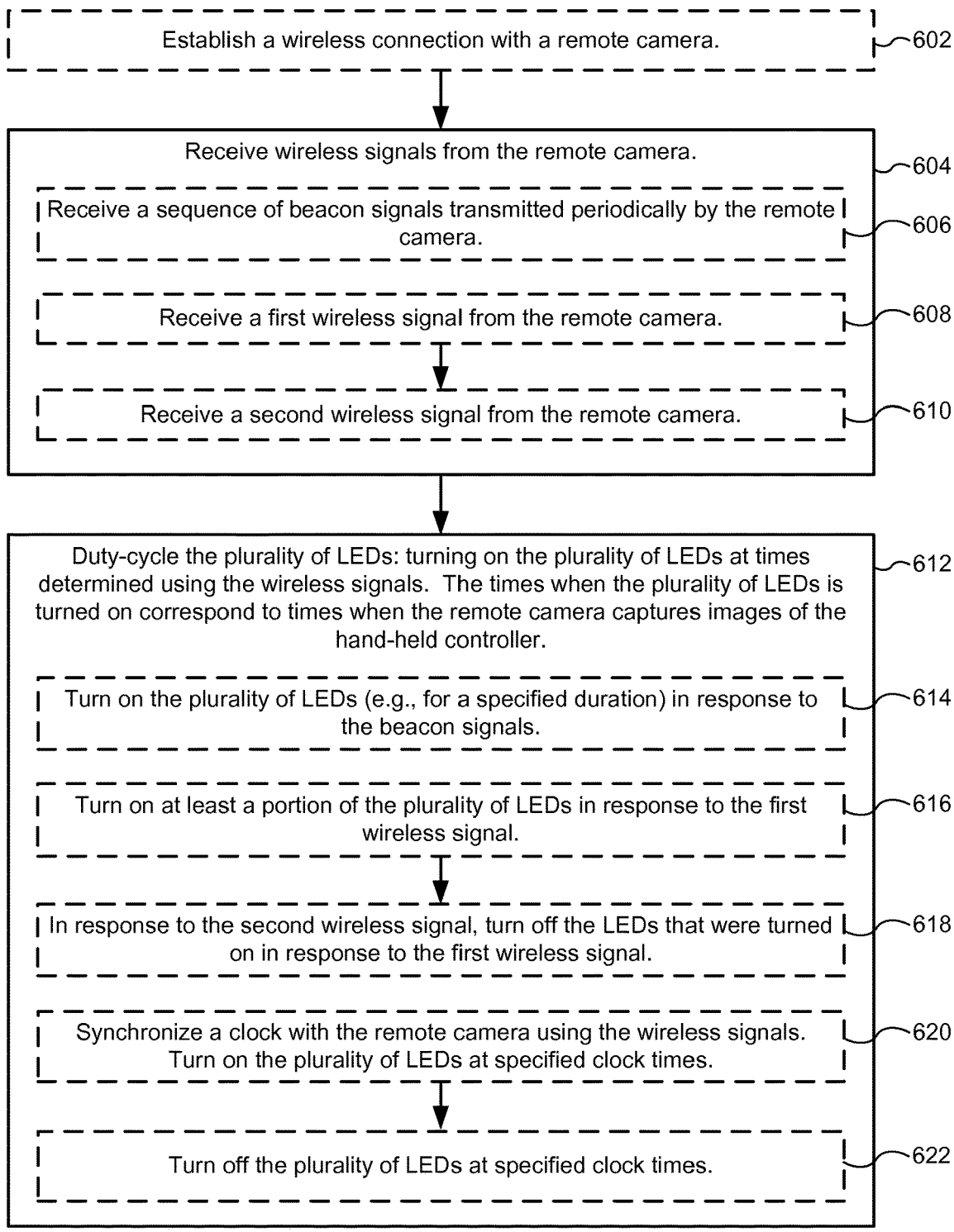
FIG. 6 is a flowchart showing a method of synchronizing the operation of light-emitting diodes with an external camera in accordance with some embodiments.

FIG. 6 is a flowchart showing a method 600 of synchronizing the operation of the LEDs 150 with an external, remote camera in accordance with some embodiments. The method 600 is performed by the hand-held controller 300. FIG. 6 is described with reference to FIG. 7, which is a timing diagram showing wireless signal transmission, LED operation, and camera operation in a system such as the virtual-reality system 100A (FIG. 1A), 100B (FIG. 1B), or 200 (FIG. 2) in accordance with some embodiments. While the wireless signals in the method 600 are described as being received from, and thus transmitted by, a remote camera 102/202, they may alternatively be transmitted by and received from a computer system in communication with the remote camera 102/202 (e.g., from the HMD 105 or from a computer coupled to the camera 202).

In some embodiments of the method 600, the hand-held controller 300 establishes (602) a wireless connection (e.g., a WiFi or Bluetooth connection) with a remote camera 102/202. Alternatively, the hand-held controller 300 establishes a wireless connection with a computer system in communication with the remote camera 102/202 (e.g., with the HMD 105 or with a computer coupled to the camera 202).

The hand-held controller 300 receives (604) wireless signals (e.g., wireless signals 702, FIG. 7) from the remote camera (e.g., via antenna 445). The hand-held controller 300 (e.g., the LED driver 480) duty-cycles (612) the plurality of LEDs 150 (e.g., LEDs 485). Duty-cycling the plurality of LEDs 150 includes turning on the plurality of LEDs 150 at times determined using the wireless signals. The times when the plurality of LEDs is turned on correspond to times when the remote camera captures images of the hand-held controller.

In some embodiments, the plurality of LEDs 150 is periodically turned on for a specified duration and then turned off (e.g., using a timer in the LED driver 480).

In some embodiments, the wireless signals are beacon signals: the hand-held controller 300 receives (606) a sequence of beacon signals transmitted (e.g., periodically) by the remote camera (or by a computer system in communication with the remote camera). For example, the wireless signals 702 (FIG. 7) may be beacon signals. The hand-held controller 300 turns on (614) the plurality of LEDs 150 in response to the beacon signals. For example, all or a portion of the LEDs 150 are turned on (704, FIG. 7) in response to each wireless signal 702. The remote camera takes pictures (706, FIG. 7) while the plurality of LEDs 150 is turned on. In some embodiments, the LEDs 150 that were turned on in response to each wireless signal 702 are turned off again after a specified period of time (e.g., in accordance with a timer), such that the plurality of LEDs 150 is off during at least a portion of the time when the remote camera is not taking pictures.

In some embodiments, the hand-held controller 300 receives (608) a first wireless signal from the remote camera and, in response, turns on (616) all or a portion of the plurality of LEDs 150. The hand-held controller 300 subsequently receives (610) a second wireless signal from the remote camera and, in response, turns off (618) the LEDs 150 that were turned on in response to the first wireless signal. The operations 608, 616, 610, and 618 may be performed repeatedly (e.g., periodically). The wireless signals thus instruct the hand-held controller 300 both to turn on and turn off the plurality of LEDs 150 in accordance with some embodiments.

Figure 7:
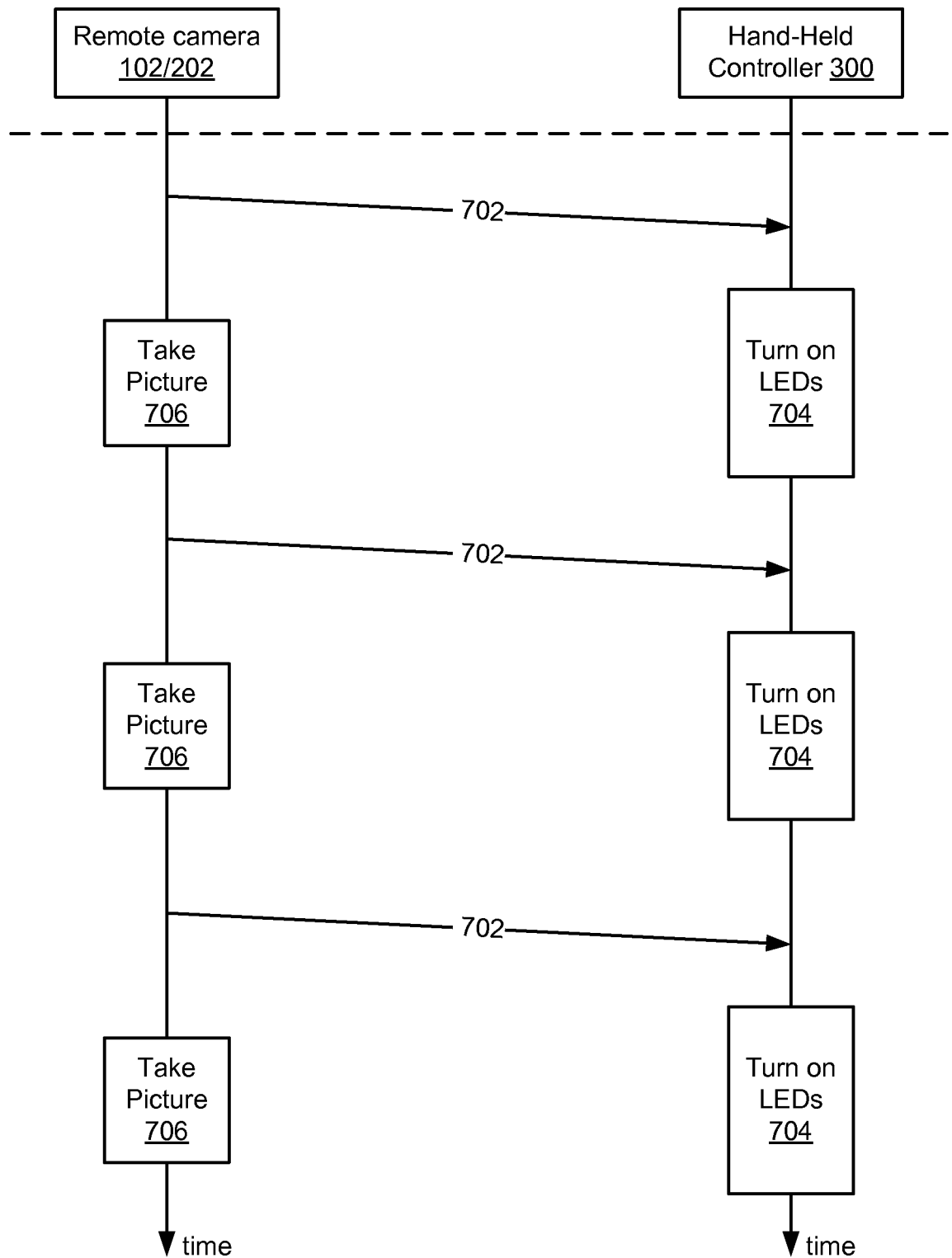
FIG. 7 is a timing diagram showing wireless signal transmission, LED operation, and camera operation in a system such as the system of FIG. 1A, 1B, or 2, in accordance with some embodiments.

In some embodiments, the hand-held controller 300 synchronizes (620) a clock (e.g., clock 477, FIG. 4) with the remote camera using the wireless signals (e.g., wireless signals 702, FIG. 7). For example, the wireless signals include timestamps that are used for clock synchronization. The hand-held controller 300 (e.g., LED driver 480) turns on (620) the plurality of LEDs 150 at specified clock times. In some embodiments, the hand-held controller 300 (e.g., LED driver 480) turns off (622) the plurality of LEDs 150 at specified clock times. Alternatively, the hand-held controller 300 (e.g., LED driver 480) turns off the plurality of LEDs 150 after a specified duration (e.g., using a timer).

In some embodiments, the remote camera is a camera 202 (FIG. 2) positioned in front of a user. Duty-cycling the plurality of LEDs 150 includes duty-cycling LEDs 150 on a portion of the cage 140 that faces the camera 202 when the user holds the hand-held controller 300 in a neutral position.

In some embodiments, the remote camera is a camera 102 (FIGS. 1A-1B) positioned on the HMD 105 as worn by a user. Duty-cycling the plurality of LEDs 150 includes duty-cycling LEDs 150 on a portion of the cage 140 that faces the HMD 105 when the user holds the hand-held controller 130 in a neutral position.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:
    at a hand-held controller for a virtual-reality system, the hand-held controller comprising an antenna, a grip, a user interface directly coupled to the grip at a first point, a cage having a ring shape directly coupled to the user interface at two points that are distinct from the first point, and a plurality of light-emitting diodes (LEDs) on an outer surface of the ring shape of the cage:
        establishing a wireless connection with a remote camera;
        using the wireless connection to receive a sequence comprising a plurality of wireless signals from the remote camera via the antenna, the wireless signals corresponding to times when the remote camera captures images of the hand-held controller; and
        duty-cycling the plurality of LEDs, the duty-cycling comprising turning on one or more LEDs of the plurality of LEDs for a specified duration in response to receiving each of the first wireless signals, thereby turning on the one or more LEDs, in synchronization with the remote camera, when the remote camera captures images of the hand-held controller.

2. The method of claim 1, wherein each wireless signal is a respective beacon signal in a sequence of beacon signals transmitted periodically by the remote camera.

3. The method of claim 1, wherein:
    the remote camera is positioned in front of a user; and
    the duty-cycling comprises duty-cycling LEDs on a portion of the cage that faces the remote camera when the user holds the hand-held controller in a neutral position.

4. The method of claim 1, wherein:
    the remote camera is positioned on a head-mounted display worn by a user; and
    the duty-cycling comprises duty-cycling LEDs on a portion of the cage that faces the head-mounted display when the user holds the hand-held controller in a neutral position.

5. A hand-held controller for a virtual-reality system, the hand-held controller comprising:
    a grip;
    a user interface directly coupled to the grip at a first point;
    a cage having a ring shape directly coupled to the user interface at two points that are distinct from the first point;
    a plurality of light-emitting diodes (LEDs) on an outer surface of the ring shape of the cage;
    an antenna to receive a sequence comprising a plurality of wireless signals through a wireless connection with a remote camera, the wireless signals corresponding to times when the remote camera captures images of the hand-held controller; and
    an LED driver to duty-cycle one or more LEDs of the plurality of LEDs for a specified duration in response to receiving each of the wireless signals received from the remote camera via the antenna, thereby turning on the one or more LEDs, in synchronization with the remote camera, when the remote camera captures images of the hand-held controller.

6. The hand-held controller of claim 5, wherein the plurality of LEDs comprises a plurality of infrared LEDs.

7. The hand-held controller of claim 5, further comprising one or more batteries to power the plurality of LEDs, the antenna, and the LED driver.

8. A hand-held controller for a virtual-reality system, the hand-held controller comprising:
    a grip;
    a user interface directly coupled to the grip at a first point;
    a cage having a ring shape directly coupled to the user interface at two points that are distinct from the first point;
    a plurality of light-emitting diodes (LEDs) positioned to be visible to a remote camera, wherein the plurality of LEDs are arranged on an outer surface of the ring shape; and
    means for duty-cycling at least one or more LEDs of the plurality of LEDs for a specified duration in response to receiving a sequence comprising a plurality of wireless signals received from the remote camera through a wireless connection with the remote camera, thereby turning on the one or more LEDs, in synchronization with the remote camera, when the remote camera captures images of the hand-held controller.

* * * * *